(12) United States Patent
Sasaki

(10) Patent No.: US 8,600,275 B2
(45) Date of Patent: Dec. 3, 2013

(54) FIXING DEVICE

(75) Inventor: Tatsuyuki Sasaki, Toyokawa (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 264 days.

(21) Appl. No.: 13/050,374

(22) Filed: Mar. 17, 2011

(65) Prior Publication Data
US 2011/0229223 A1 Sep. 22, 2011

(30) Foreign Application Priority Data
Mar. 19, 2010 (JP) ................................. 2010-063395

(51) Int. Cl.
*G03G 15/20* (2006.01)
(52) U.S. Cl.
USPC .......................................................... 399/328
(58) Field of Classification Search
USPC ................................................. 399/320, 328
See application file for complete search history.

(56) References Cited

U.S. PATENT DOCUMENTS

| 2002/0001481 A1* | 1/2002 | Kiuchi ........................... 399/122 |
| 2007/0092311 A1* | 4/2007 | Fujimoto ....................... 399/328 |
| 2009/0208261 A1* | 8/2009 | Kobayashi et al. ........... 399/328 |
| 2010/0209154 A1* | 8/2010 | Kim et al. ..................... 399/333 |

FOREIGN PATENT DOCUMENTS

| JP | 2007-171387 | 7/2007 |
| JP | 2008-52184 | 3/2008 |
| JP | 2009-133935 | 6/2009 |

OTHER PUBLICATIONS

Translation of Takushi (JP 2008 052184 A, pub. date, Mar. 6, 2008).*

* cited by examiner

*Primary Examiner* — Walter L Lindsay, Jr.
*Assistant Examiner* — Frederick Wenderoth
(74) *Attorney, Agent, or Firm* — Morrison & Foerster LLP

(57) ABSTRACT

A fixing device having: a heating roller and a presser that form a fixing nip portion therebetween; a pair of brackets having holes for supporting both end portions of the heating roller; a biasing member for pressing the presser against the heating roller to form the fixing nip portion; and a pair of semicircular arc slide bearings that are fitted in the holes of the respective brackets so as to be located between the respective brackets and the heating roller, on an opposite side of the heating roller to a side thereof pressed by the presser.

13 Claims, 3 Drawing Sheets

FIXING DEVICE

This application is based on Japanese Patent Application No. 2010-063395, filed on Mar. 19, 2010, the content of which is incorporated herein by reference.

BACKGROUND OF THE INVENTION

1. Field of the Invention

The present invention relates to a fixing device, and particularly to a fixing device to be employed in an electrophotographic image forming apparatus, such as a copier and a printer, as a device for fixing a toner image on a sheet by heat.

2. Description of Related Art

Generally, in a fixing device of this kind, a heating roller and a pressing roller are juxtaposed to be pressed against each other with a specified pressing force, and while a recording sheet with a toner image thereon is passing between the rollers, the toner image is fixed on the recording sheet. The heating roller is driven to rotate at a predetermined rate, and the heating roller is held by a bearing member that permits the heating roller to freely rotate in the radial direction while regulating the position of the heating roller in the thrust direction. Conventionally, there has been normally used a slide bearing or a C-ring for positional regulation in the thrust direction, in combination with a radial bearing.

However, combining two or more components for a bearing member is not good because it requires a larger number of components as well as a larger number of assembly steps. Further, in order to mount the heating roller to such a conventional bearing member, the heating roller is required to be moved in the thrust direction, which is a complicated operation. Moreover, the radial bearing hardly expands/contracts with a temperature change because of the material and the structure thereof, while the heating roller, which is made of aluminum, expands/contracts to a relatively large degree with a temperature change. Thus, when there is a large difference in thermal expansion coefficient between the bearing member and the heating roller, an unexpected backlash or bite occurs with a temperature change. Also, a process of fitting the C-ring, which is a component for regulating the position of the heating roller in the thrust direction, to the heating roller is troublesome, and this process may cause damage on the heating roller. Further, in order to permit the C-ring fitting process, it is necessary to make a slit in the heating roller, which necessitates an elongation of the heating roller, that is, prevents downsizing of the heating roller.

Japanese Patent Laid-Open Publication No. 2007-171387 describes that a sleeve-like slide bearing composed of two fired bodies that are made of a material mainly containing tetrafluoroethylene resin into shapes with semicircular arc cross sections in the axial directions is used as a bearing of the heating roller. Although this slide bearing has a favorable characteristic of having a low rotational torque, the slide bearing complicates the structure of the bearing member. Specifically, this bearing member requires another component for regulating the position of the heating roller in the thrust direction, and in mounting the heating roller in the bearing member, it is necessary to move the heating roller in the axial direction. Thus, the above-described problems are left unsolved.

SUMMARY OF THE INVENTION

An object of the present invention is to provide a fixing device that can be assembled easily and that can be assembled into a small size.

A fixing device according to a first aspect of the present invention comprises: a heating roller and a presser that form a fixing nip portion therebetween; a pair of brackets having holes for supporting both end portions of the heating roller; a biasing member for pressing the presser against the heating roller to form the fixing nip portion; and a pair of semicircular arc slide bearings that are fitted in the holes of the respective brackets so as to be located between the respective brackets and the heating roller, on an opposite side of the heating roller to a side thereof pressed by the presser.

A fixing device according to a second aspect of the present invention comprises: a heating roller and a presser that form a fixing nip portion therebetween; a pair of brackets having holes for supporting both end portions of the heating roller; a biasing member for pressing the presser against the heating roller to form the fixing nip portion; and a pair of semicircular arc slide bearings that are fitted in the holes of the respective brackets so as to be located between the respective brackets and the heating roller, on an opposite side of the heating roller to a side thereof pressed by the presser; wherein each of the slide bearings has a wall protruding outward to a periphery of the hole of the bracket so as to prevent the slide bearing itself from coming off from the bracket; wherein the heating roller is a hollow pipe having a predetermined radius; wherein the semicircular arc slide bearings have a radius almost equal to the radius of the heating roller and are in contact with a peripheral surface of the heating roller; and wherein the slide bearings are made of a resin material having heat resistance and abrasion resistance.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Figure 1:
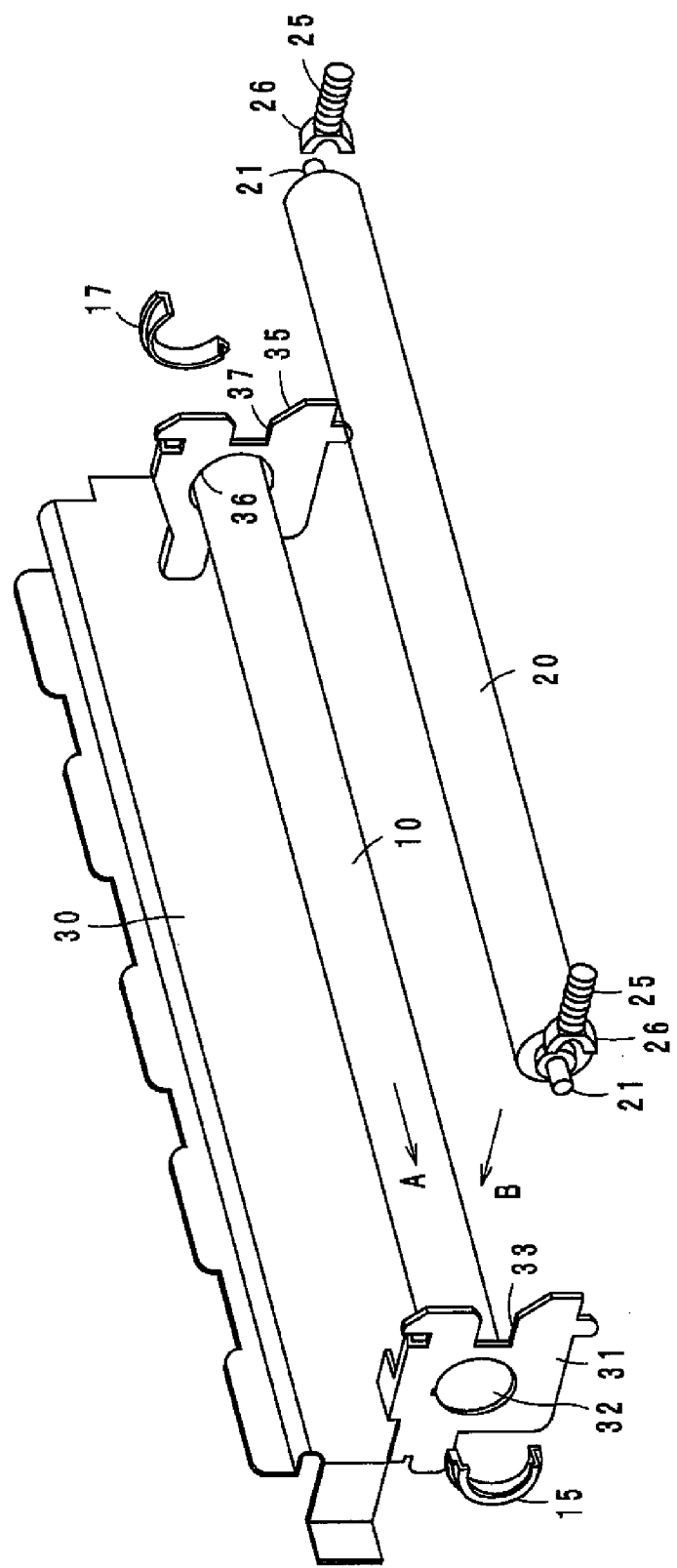
FIG. 1 is an exploded perspective view of a main part of a fixing device according to an embodiment of the present invention.

Hereinafter, an embodiment of the fixing device according to the present invention is described with reference to the accompanying drawings. It is to be noted that in the drawings, common components and portions are provided with the same reference numerals, and descriptions thereof will not be repeated.

As shown in FIG. 1, a fixing device according to an embodiment of the present invention comprises a heating roller 10 and a pressing roller 20 juxtaposed to each other and pressed against each other by a predetermined pressing force. Both of the rollers 10 and 20 are fixed to a frame 30 in a structure described hereinafter, and are housed in a cover member (not shown).

The heating roller 10 comprises an aluminum cylindrical body, a rubber layer coated on the aluminum cylindrical body and a fluorine resin layer coated on the rubber layer as a mold-release layer. In order to facilitate holding of the heating roller 10, the rubber layer and the fluorine resin layer are not coated in the end portions of the roller 10. The pressing roller 20 comprises an aluminum cylindrical body, a silicone rubber layer coated on the aluminum cylindrical body and a fluorine resin tube covered around the silicone rubber layer as a mold-release layer. Further, a heater (not shown) is incorporated in the heating roller 10.

Figure 2:
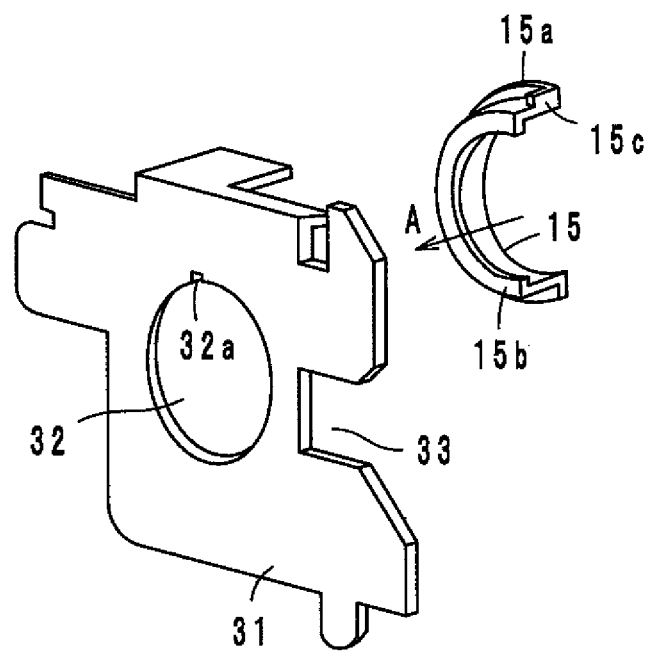
FIG. 2 is an exploded perspective view of a slide bearing and a bracket of the fixing device.
Figure 4:
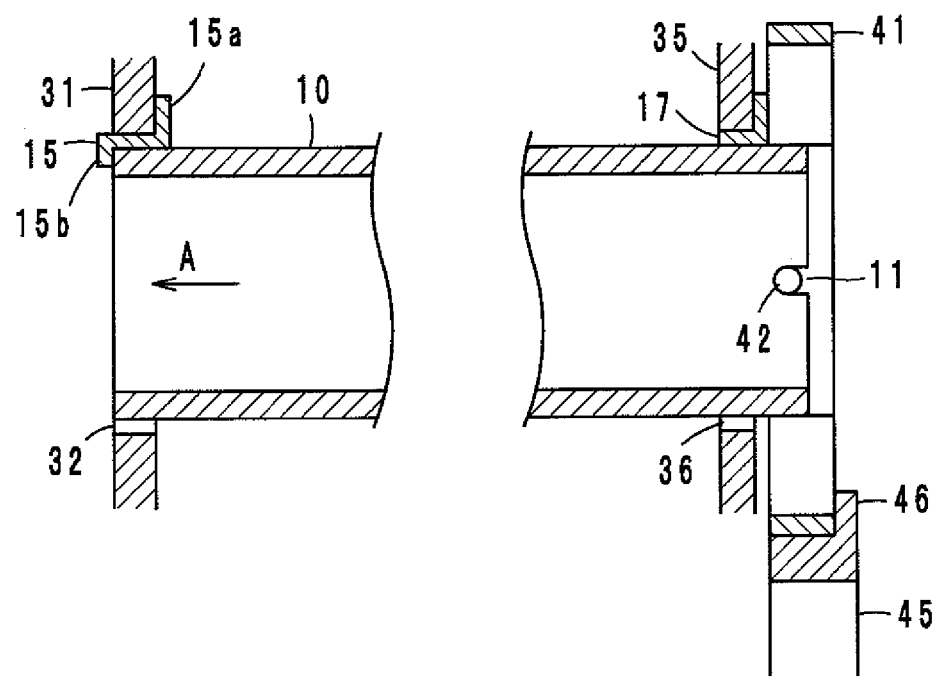
FIG. 4 is a sectional view of a bearing structure for a heating roller.

One end portion (first end portion) of the heating roller 10 is held by a bracket 31 via a slide bearing 15, and the other end portion (second end portion) is held by a bracket 35 via a slide bearing 17. As shown in FIG. 2, the slide bearing 15, which is shaped into a semicircular arc, is fitted in a hole 32 of the bracket 31 in a direction of arrow A. The slide bearing 15 has a first wall 15*a* protruding outward, that is, in a direction away from the center of the semicircular arc and a second wall 15*b* protruding inward, that is, in a direction toward the center of the semicircular arc. When the slide bearing 15 is fitted in the hole 32, the first wall 15*a* leans against the bracket 31 in the periphery of the hole 32 from the direction of arrow A, and thereby serves to prevent the slide bearing 15 itself from coming off from the bracket 31. Then, when the first end portion of the heating roller 10 is fitted to the slide bearing 15, as shown in FIG. 4, the second wall portion 15*b* serves to regulate the position of the heating roller 10 in the direction of arrow A (thrust direction).

Further, as shown in FIG. 2, the slide bearing 15 has a projected portion 15*c*, and the hole 32 of the bracket 31 has a depressed portion 32*a* to come into engagement with the projected portion 15*c*. Engagement of the projected portion 15*c* with the depressed portion 32*a* prevents the slide bearing 15 from moving along the circumference of the hole 32.

Figure 3:
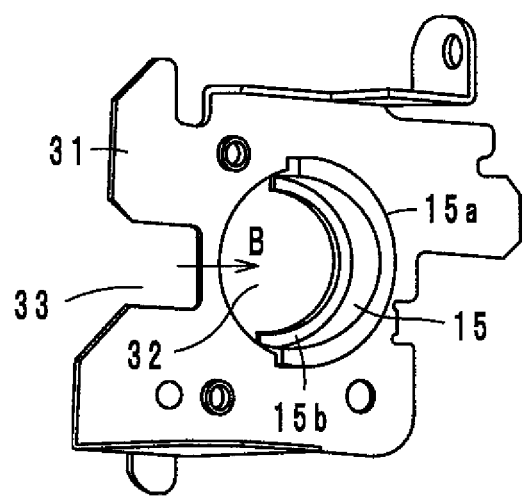
FIG. 3 is a perspective view showing a state where the slide bearing is fitted in the bracket.

The first end portion of the heating roller 10 is mounted to the slide bearing 15 from a direction of an arrow B (direction orthogonal to the thrust direction) shown in FIG. 3, and then pressed by the pressing roller 20 from the direction of arrow B, and thereby, the heating roller 10 can be held at a predetermined position. The slide bearing 15 supports the first end portion of the heating roller 10 such that the heating roller 10 can rotate freely in the radial direction while preventing the heating roller from moving in the thrust direction with the second wall 15*b*.

As shown in FIG. 1, the other end portion (second end portion) of the heating roller 10 is supported by the slide bearing 17 such that the heating roller 10 can rotate freely in the radial direction. The slide bearing 17 is shaped into a semicircular arc having an L-shaped cross section. This slide bearing 17 is fitted in a hole 36 of the bracket 35 as shown in FIG. 4, and the second end portion of the heating roller 10 is mounted to the slide bearing 17 from the direction of arrow B in the same way of mounting the first end portion of the heating roller 10 to the slide bearing 15. Thereafter, the second end portion of the heating roller 10 is pressed by the pressing roller 20 from the direction of arrow B.

As shown in FIG. 4, a gear 41 for transmission of rotating force is provided at the second end of the heating roller 10. A pin 42 standing on an inner circumferential surface of the gear 41 engages with a depressed portion 11 made in the second end surface of the heating roller 10. Thereby, the heating roller 10 rotates integrally with the gear 41. Further, the gear 41 engages with another gear 45, and a flange 46 provided on an outer side of this gear 45 comes into contact with an outer side of the gear 41, thereby preventing the heating roller 10 from moving in the opposite direction to arrow A.

Meanwhile, as shown in FIG. 1, the pressing roller 20 is supported by members 26 that are elastically biased by coil springs 25. More specifically, pins 21 provided on both of the end surfaces of the pressing roller 20 are supported by the members 26 such that the pressing roller 20 can freely rotate.

The members 26 are held at fixed positions by engagement with depressed portions 33 and 37 of the brackets 31 and 35, respectively.

In the present embodiment, the first end portion of the heating roller 10 is supported by the slide bearing 15 such that the heating roller 10 can rotate freely in the radial direction and cannot move in the thrust direction (direction of the arrow A). Thus, one component, namely, the slide bearing 15 has two functions. Further, since the slide bearing 15 is shaped into a semicircular arc, the heating roller 10 can be mounted to the slide bearing 15 from the direction orthogonal to the thrust direction (direction of the arrow B). This eliminates the need to move the heating roller 10 in the thrust direction in mounting the heating roller 10 to the slide bearing 15, thereby facilitating the assembly. Moreover, since no C-rings are used, the assembly is easy, and there is no possibility that the heating roller 10 may be damaged by a C-ring. Also, there is no need to elongate the heating roller 10.

Further, it is preferred that a resin material having abrasion resistance and heat resistance is used for the slide bearings 15 and 17. For example, PPS resin (polyphenylene sulfide resin) is suited to be used for the slide bearings 15 and 17. This kind of resin is comparable to the material of the heating roller 10 (aluminum) and to the metal or resin material of the brackets 31 and 35 in coefficient of thermal expansion. Therefore, with temperature changes, this kind of resin expands/contracts to substantially the same degree as the heating roller 10, the brackets 31 and 35. Therefore, even when the heating roller 10 expands due to heat during operation of the fixing device, there is no possibility that an unexpected backlash or bite may occur between these members.

Figure 5:
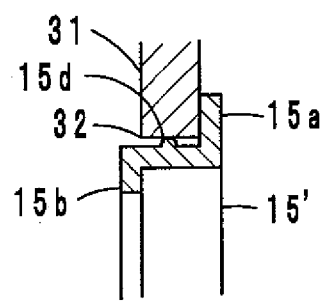
FIG. 5 is a sectional view of a modified slide bearing.

FIG. 5 shows a modified slide bearing 15'. The slide bearing 15' has the same structure as the slide bearing 15 except that the slide bearing 15' has a plurality of (preferably two) small projections 15*d* on the outer circumferential surface at predetermined intervals. The small projections 15*d* of the slide bearing 15' come into contact with the edge surface of the hole 32, thereby allowing absorption of a difference between the outer shape of the slide bearing 15' and the shape of the hole 32. That is, when the slide bearing 15 and the edge surface of the hole 32 make surface contact with each other, abrasion may occur locally at an unexpected portion due to errors in roundness of the slide bearing 15 and the hole 32, which results in a degradation in function as a bearing. However, when the slide bearing 15 and the peripheral surface of the hole 32 make point contact with each other at the small projections 15', only the small projections 15*d* will be abraded, which never leads to a degradation in function as a bearing.

Other Embodiments

The slide bearing for supporting the second end portion of the heating roller may be designed arbitrarily. Also, although in the above-described embodiment, the flanges of the gears 45 and 46 regulate the position of the second end portion of the heating roller in the thrust direction, it is possible to use any other structure to regulate the position of the second end portion of the heating roller in the thrust direction. Further, various structures are possible to permit the pressing roller to be driven to rotate by rotation of the heating roller while staying in a fixed position.

According to the embodiments, the fixing device can be assembled easily and can be downsized.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A fixing device comprising:
   a heating roller and a presser that form a fixing nip portion therebetween;
   a pair of brackets having holes for supporting both end portions of the heating roller;
   a biasing member for pressing the presser against the heating roller to form the fixing nip portion; and
   a pair of semicircular arc slide bearings that are fitted in the holes of the respective brackets so as to be located between the respective brackets and the heating roller, on an opposite side of the heating roller to a side thereof pressed by the presser.

2. The fixing device according to claim 1, wherein each of the slide bearings has a wall protruding outward to a periphery of the hole of the bracket so as to prevent the slide bearing itself from coming off from the bracket.

3. The fixing device according to claim 1,
   wherein the heating roller is a hollow pipe having a predetermined radius; and
   wherein the semicircular arc slide bearings have a radius almost equal to the radius of the heating roller and are in contact with a circumferential surface of the heating roller.

4. The fixing device according to claim 1, wherein the slide bearings are made of a resin material having heat resistance and abrasion resistance.

5. The fixing device according to claim 1, wherein the slide bearings and the brackets have projected portions and depressed portions, respectively, such that engagements between the projected portions and the depressed portions can prevent the slide bearings from rotating in the holes of the brackets.

6. The fixing device according to claim 1, wherein the heating roller has a depressed portion to come into engagement with a pin for transmission of rotating force.

7. The fixing device according to claim 1, wherein one of the slide bearings has a first wall protruding outward to a periphery of the hole of the bracket for prevention of the slide bearing itself from coming off from the bracket, and a second wall in contact with one end of the heating roller for prevention of the heating roller from moving in a thrust direction.

8. The fixing device according to claim 1, wherein each of the slide bearings has a plurality of small projections in contact with an edge surface of the hole of the bracket.

9. A fixing device comprising:
   a heating roller and a presser that form a fixing nip portion therebetween;
   a pair of brackets having holes for supporting both end portions of the heating roller;
   a biasing member for pressing the presser against the heating roller to form the fixing nip portion; and
   a pair of semicircular arc slide bearings that are fitted in the holes of the respective brackets so as to be located between the respective brackets and the heating roller, on an opposite side of the heating roller to a side thereof pressed by the presser;
   wherein each of the slide bearings has a wall protruding outward to a periphery of the hole of the bracket so as to prevent the slide bearing itself from coming off from the bracket;
   wherein the heating roller is a hollow pipe having a predetermined radius;
   wherein the semicircular arc slide bearings have a radius almost equal to the radius of the heating roller and are in contact with a peripheral surface of the heating roller; and
   wherein the slide bearings are made of a resin material having heat resistance and abrasion resistance.

10. The fixing device according to claim 9, wherein the slide bearings and the brackets have projected portions and depressed portions, respectively, such that engagements between the projected portions and the depressed portions can prevent the slide bearings from rotating in the holes of the brackets.

11. The fixing device according to claim 9, wherein the heating roller has a depressed portion to come into engagement with a pin for transmission of rotating force.

12. The fixing device according to claim 9, wherein one of the slide bearings has a first wall protruding outward to a periphery of the hole of the bracket for prevention of the slide bearing itself from falling off from the bracket, and a second wall in contact with one end of the heating roller for prevention of the heating roller from moving in a thrust direction.

13. The fixing device according to claim 9, wherein each of the slide bearings has a plurality of small projections in contact with an edge surface of the hole of the bracket.

* * * * *